United States Patent [19]

Asagi et al.

[11] Patent Number: 4,642,771
[45] Date of Patent: Feb. 10, 1987

[54] DIAGNOSTIC PROCESSING SYSTEM FOR AUTOMATIC TRANSMISSION OF AN AUTOMOBILE

[75] Inventors: Yasuyoshi Asagi, Kawasaki; Noriaki Ogawa, Tokyo; Hitoshi Kasai, Kawasaki; Toshihiro Hattori, Ayase; Makoto Uriuhara, Yokohama, all of Japan

[73] Assignee: Fujitsu Limited, Kawasaki, Japan

[21] Appl. No.: 625,681

[22] Filed: Jun. 28, 1984

[30] Foreign Application Priority Data

Jun. 30, 1983 [JP] Japan .................. 58-119161

[51] Int. Cl.⁴ ............................. B60K 41/04
[52] U.S. Cl. .................... 364/424.1; 74/866
[58] Field of Search ........... 364/424.1; 73/118, 117.3; 74/866, 878; 192/0.052

[56] References Cited

U.S. PATENT DOCUMENTS

| | | |
|---|---|---|
| 3,530,668 | 9/1970 | Siebers et al. |
| 3,937,105 | 2/1976 | Arai et al. |
| 3,946,842 | 3/1976 | Siebers et al. |
| 4,253,348 | 3/1981 | Will et al. ............... 74/866 |
| 4,312,248 | 1/1982 | Sugimoto et al. ........ 74/866 |
| 4,380,048 | 4/1983 | Kishi et al. ............. 364/424.1 |
| 4,411,174 | 10/1983 | Yokoi et al. ............ 74/866 |
| 4,492,112 | 1/1985 | Igarashi et al. ......... 73/117.3 |
| 4,495,457 | 1/1985 | Stahl .................... 364/424.1 |
| 4,523,281 | 6/1985 | Noda et al. ............. 364/424.1 |

FOREIGN PATENT DOCUMENTS

| | | |
|---|---|---|
| 0046845 | 3/1982 | European Pat. Off. |
| 2338122 | 2/1975 | Fed. Rep. of Germany. |
| 2341797 | 2/1975 | Fed. Rep. of Germany. |
| 1809021 | 7/1977 | Fed. Rep. of Germany. |
| 1505535 | 9/1977 | Fed. Rep. of Germany. |
| 2511107 | 2/1983 | France. |
| 0204360 | 12/1982 | Japan ................... 364/424.1 |

Primary Examiner—Parshotam S. Lall
Attorney, Agent, or Firm—Staas & Halsey

[57] ABSTRACT

A diagnostic processing system for the automatic transmission of an automobile to cooperate with an instruction element for producing an actuation signal for driving the transmission gears and clutch. The system is chiefly comprised of a gear position sensor which senses the gear position of the transmission gears and a diagnostic check element which determines, based on a gear position signal from the sensor and other information regarding the automobile's operation, the validity of the actuation signal.

18 Claims, 13 Drawing Figures

Fig. 4

| SHIFT-SIDE | | | SELECTION-SIDE | | | POSITION | VARIABLE (GEAR) |
|---|---|---|---|---|---|---|---|
| G135 | GN | G24R | G12 | G34 | G5R | | |
| 1 | 0 | 0 | 1 | 0 | 0 | 1 | 01 |
| | | | 0 | 1 | 0 | 3 | 03 |
| | | | 0 | 0 | 1 | 5 | 05 |
| 0 | 1 | 0 | 1 | 0 | 0 | N1 | 0A |
| | | | 0 | 1 | 0 | N2 | 0C |
| | | | 0 | 0 | 1 | N3 | 0E |
| 0 | 0 | 1 | 1 | 0 | 0 | 2 | 02 |
| | | | 0 | 1 | 0 | 4 | 04 |
| | | | 0 | 0 | 1 | R | 06 |
| 0 | 0 | 0 | 0 | 0 | 0 | ✷1 | 30+ |
| 0 | 0 | 0 | X | X | X | ✷2 | 10+ |
| 0 | 1 | 0 | 0 | 0 | 0 | ✷3 | 28+ |
| X | 0 | X | 0 | 0 | 0 | ✷4 | 20+ |

Din = PSGH, PSGE

Dout

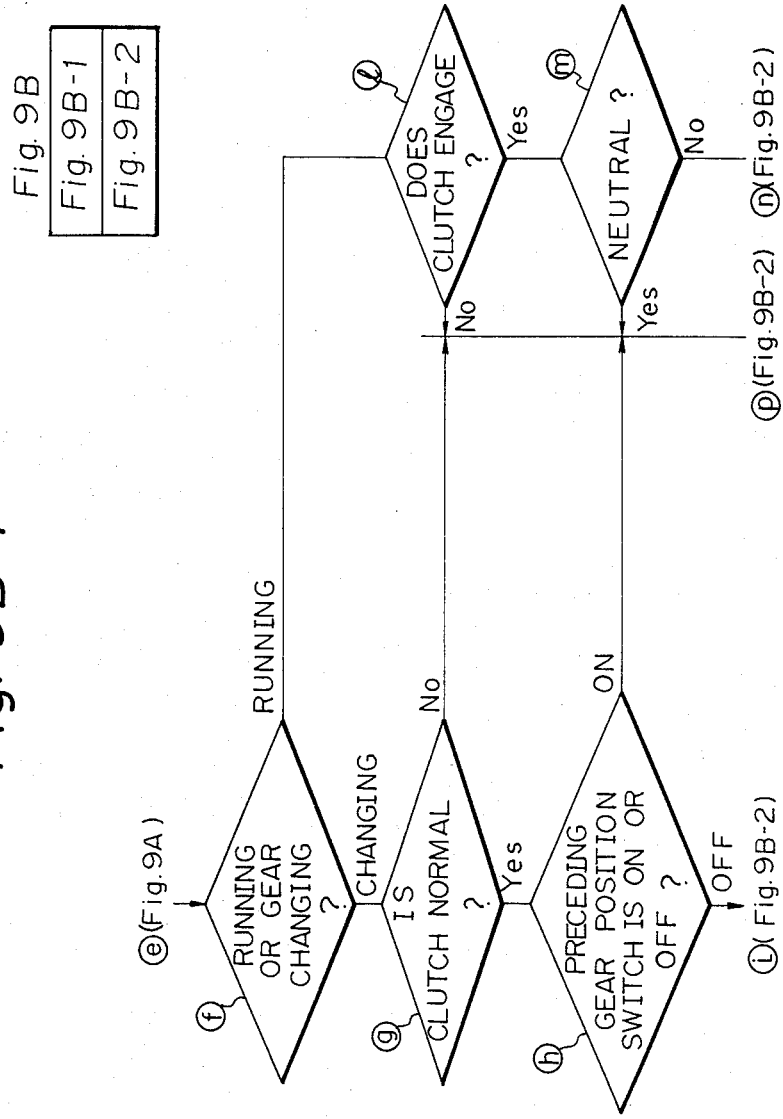

DIAGNOSTIC PROCESSING SYSTEM FOR AUTOMATIC TRANSMISSION OF AN AUTOMOBILE

BACKGROUND OF THE INVENTION

1. Field of the Invention

The present invention relates to a diagnostic processing system for an automatic transmission in an automobile.

The diagnostic processing system of the present invention cooperates with the automatic transmission of an automobile through the innovation of a gear position sensor. In particular, the gear position sensor is useful for an electronic controlled automatic transmission, in that the sensor is used for detecting, among a plurality of possible gear positions, what the gear position is at any given moment. The present invention specifically refers to various factors to be checked through a diagnostic process, such as completion of a gear-out operation, completion of a gear-in operation, and completion of a gear change, etc.

2. Description of the Prior Art

As is well known, in an automobile equipped with an automatic transmission, awkward clutch operation is eliminated by automatically effecting so-called gear changes; enabling relatively trouble-free operation of the automobile by even an unskilled driver. Recently, the trend is toward the realization of a computer-assisted automatic transmission, namely an electronic controlled automatic transmission. Among the various types of electronic controlled automatic transmissions, the present invention refers to one in which the automatic transmission is basically composed of components identical to those incorporated in manually operated transmissions, i.e., clutch and slidable-mesh gear transmissions, but in which these components are controlled by a microprocessor in response to relevant data, such as an accelerator position signal, an automobile speed signal, etc.

Automobile transmissions should operate with a high degree of reliability, and various systems have been proposed to attain this high reliability. However, none of these systems have yet attained the required reliability with respect to the aforementioned type of automatic transmission.

SUMMARY OF THE INVENTION

Therefore, it is an object of the present invention to provide a system which will attain high reliability for an automatic transmission in an automobile. Specifically, the present invention provides a diagnostic processing system for an automatic transmission of the type mentioned above.

Basically, the above object is attained by employing a gear position sensor. Signals output from the gear position sensor, and also other information signals, are received by a system which then determines whether or not a gear-out operation is completed, a gear-in operation is completed, and if the sensor is operating normally. Further, if the sensor operation is abnormal, the system provides backup support for the sensor.

BRIEF DESCRIPTION OF THE DRAWINGS

FIG. 4 is an explanatory drawing of a table memory;

FIGS. 9A, 9B1, 9B2, and 9C are flow charts of the diagnostic procedure performed in the switch check and backup element illustrated in FIG. 8, and;

DESCRIPTION OF THE PREFERRED EMBODIMENTS

Before describing the preferred embodiments of the present invention, an explanation will be given of a known automatic transmission apparatus.

Figure 1:
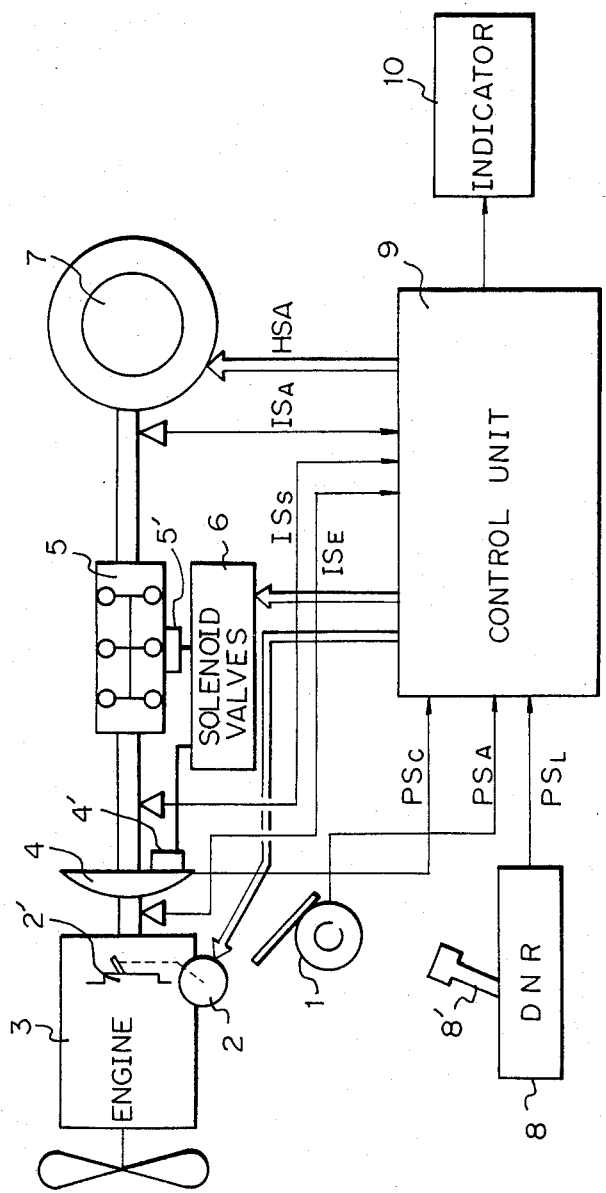
FIG. 1 is a block diagram of a known electronic controlled automatic transmission provided in a body of an automobile.

FIG. 1 is a block diagram of a known electronic controlled automatic transmission provided in a body of an automobile. The present invention is applied to an automobile having the components illustrated in FIG. 1. That is, a conventional clutch and sliding-mesh type transmission gears are actuated by respective actuators under the control of a control unit, in which a conventional torque-converter and auxiliary subtransmission are not used. In FIG. 1, reference numeral 1 represents an accelerator pedal, 2 a throttle actuator for adjusting a throttle valve 2', 3 an engine, 4 a clutch, 5 transmission gears, 6 solenoid valves for driving a clutch actuator 4' and a transmission actuator 5'. Reference numeral 7 represents a drive wheel and 8 a mode selector provided with a select lever 8', for manually selecting a drive mode such as drive (D), neutral (N), and reverse (R). Reference numeral 9 represents a control unit, including a microprocessor, for controlling the throttle actuator 2, the solenoid valves 6, and for producing a hill start aid output (HSA), and 10 represents an indicator for displaying the present gear position of the transmission 5.

The control unit 9 receives, at respective input ports, a lever position signal $PS_L$ from the selector 8 and an accelerator position signal $PS_A$ from the accelerator pedal 1, i.e., throttle angle signal. The control unit 9 also receives an engine speed indication signal $IS_E$ from the engine 3, a clutch position signal $PS_C$ from the clutch 4, a rotational input-shaft speed indication signal $IS_S$, and an automobile speed indication signal $IS_A$, etc. Note, the above-mentioned input signals $PS_L$, $PS_A$, $PS_C$, $IS_E$, $IS_S$, and so on (not shown) are detected by and produced from suitable individual sensors. These sensors are widely known.

The control unit 9 receives and processes the individual input signals from these sensors to produce output signals at the respective output ports, thereby controlling the engine speed through the throttle actuator 2, engagement or disengagement of the clutch 4 through the clutch actuator 4', and gear changes in the transmission 5 through the transmission actuator 5'. Specifically, the engagement or disengagement of the clutch 4 is determined by an instruction element of the control unit 9 in response to the engine speed indication signal $IS_E$ and the rotational input-shaft speed indication signal $IS_S$. The gear change in the transmission is controlled in response to the accelerator position signal $PS_A$, indicative of the throttle angle, and the engine speed indication signal $IS_E$, with reference to a transmission map (FIG. 2).

Figure 2:
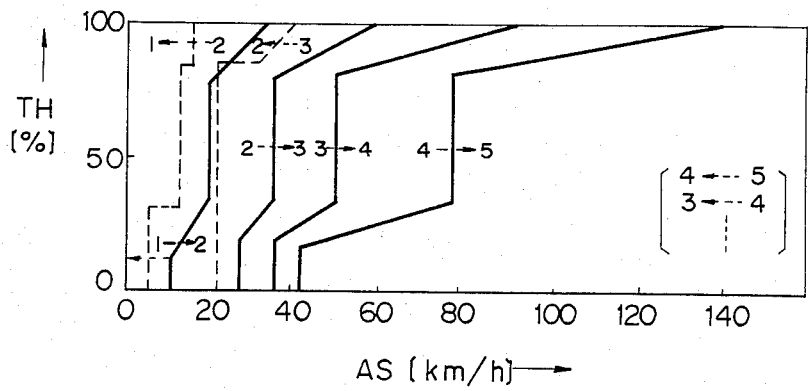
FIG. 2 is a map used for determining a suitable gear position for a predetermined automobile speed.

FIG. 2 is a map used for determining a suitable gear position. The map determines a gear position best suited for the running of the automobile in accordance with the throttle angle TH, in %, and the automobile speed AS in km/h. A TH of 100% represents a state in which the throttle valve is fully opened, while a TH of 0% represents a state in which the throttle valve is closed. In the map of FIG. 2, numerals 1, 2, 3, 4, and 5 denote individual gear positions. The curves indicated by solid lines represent gear change borders during acceleration, while the curves indicated by broken lines represent gear change borders during deceleration. With reference to FIG. 1, when the condition of the running automobile is to be changed to another more suitable condition, through the accelerator position signal $PS_A$ and the automobile speed indication signal $IS_S$ by referring to the above-mentioned transmission map of FIG. 2, the clutch 4 is first disengaged by the clutch actuator 4' under control of the control unit 9. Then, when it is determined that the clutch 4 is completely disengaged, through the clutch position signal $PS_C$, the transmission actuator 5' is activated to select a suitable gear position according to the transmission map. Thus, the related gear change operation is completed. The clutch actuator 4' is then activated to re-engage the cluth 4. From the viewpoint of high reliability of the automatic transmission operation, it is important to fully ascertain whether or not the gear-out operation is correctly completed, and also, whether or not the gear-in operation is correctly completed, at least during the gear change operation. It is further important to ensure that the gear change operation as a whole is correctly completed, and that the gear position sensor (reference numeral 21 in FIG. 3) has not failed; and if such a failure condition does exst, to effect a particular backup treatment as soon as possible.

Figure 3:
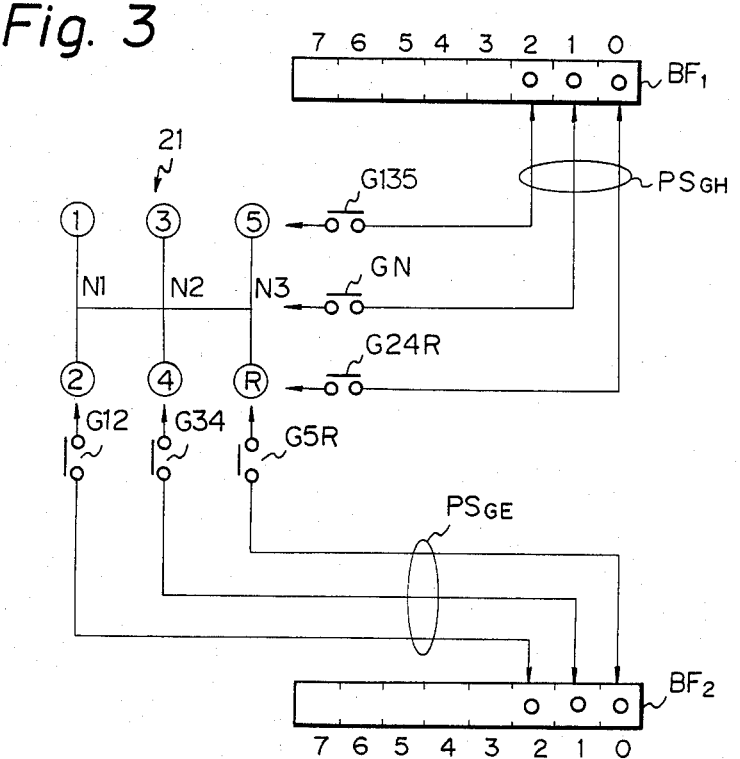
FIG. 3 is a circuit diagram of a gear position sensor and its peripheral members.

The system of the present invention operates to supervise the conditions of the clutch 4, transmission gears 5, and so on, as illustrated in FIG. 1, and to this end a gear position sensor 21 (FIG. 3) is introduced into the system. FIG. 3 is a circuit diagram of a gear position sensor and its peripheral members. In FIG. 3, the gear position sensor is generally represented by reference numeral 21. The gear position sensor 21 is located in the transmission gearbox 5 (FIG. 1) and comprises gear position switches G12, G34, G5R, G135, GN, and G24R. Data indicating the on/off state of each gear position switch is stored in 8-bit buffer registers $BF_1$ and $BF_2$.

Encircled reference numerals 1 through 5 of FIG. 3 denote first through fifth gear positions, respectively. Encircled R denotes the reverse gear position. The gear position to be selected is determined by the gear position switches (G). These switches (G) are classified as shift-side switches G135, GN, and G24R, and selection-side switches G12, G34, and G5R. Data indicating the on/off state of these switches is stored, as mentioned before, in the buffer registers $BF_1$ and $BF_2$, both of which can be formed from an element of the microprocessor, i.e., the control unit 9 of FIG. 1. When one of the first, third and fifth gear positions is selected, the switch G135 is turned on. In this case, the actuator of the switch G135, can be mechanically actuated by the selected transmission gear 5 (FIG. 1) (this also applies to switches GN, G24R). When the transmission is set at the neutral gear position, the switch GN is turned on. When one of the second and fourth gear positions and the reverse gear position is selected, the switch G24R is turned on.

For the selection-side switches (G), when one of the first and second gear positions and the neutral gear position N1 is selected, the switch G12 is turned on. In this case, the actuator of the switch G12 can be mechanically actuated by the selected transmission gear 5 (FIG. 1) (this also applies to switches G34 and G5R). When one of the third and fourth gear positions and the neutral gear position N2 is selected, the switch G34 is turned on. When one of the fifth gear position, the neutral gear position N3, and the reverse gear position is selected, the switch G5R is turned on. Thus, when one of the first, through fifth gear positions, the reverse and the neutral gear positions (N1, N2, N3) is selected, only one of the corresponding shift-side switches G135, GN, and G24R is turned on, and simultaneously, only one of the corresponding selection-side switches G12, G34, and G5R is turned on. For example, if the gear position switch G24R at the shift-side is closed (turned on) and, at the same time, the gear position G12 at the selection-side is closed, the microprocessor can determine that the second gear position is actually selected at that moment. In another example, if the gear position switch G135 at the shift-side is closed (turned on) and, at the same time, the gear position switch G5R at the selection-side is closed, the microprocessor can determine that the fifth gear position is actually selected at that moment.

The diagnostic processing system of the present invention will be now explained in detail. This explanation will first deal with the case where the aforesaid determination regarding the gear-out operation and gear-in operation is made. That is, the determination is made by analyzing the gear position signals $PS_{GH}$ and $PS_{GE}$ (FIG. 3), the usual rotational input-shaft speed indication signal $IS_S$ (FIG. 1), and the usual automobile speed indication signal $IS_A$ (FIG. 1).

As previously mentioned with reference to FIG. 3, for example, it is judged that the second gear position has been selected if the gear position switches G24R and G12 are both closed. Similarly, it is judged that the fifth gear position has been selected if the gear position switches G135 and G5R are both closed. The above-mentioned judgement is achieved in reference to a table stored in a table memory, as shown in FIG. 4.

FIG. 4 is an explanatory drawing of a table memory. The table memory can be comprised of a read only memory (ROM) contained in a control unit (corresponding to the control unit 9 of FIG. 1), which will be explained with reference to FIG. 5 hereinafter. In FIG. 4, the gear position signals $PS_{GH}$ and $PS_{GE}$ (FIG. 3) are applied, as input data $D_{in}$, and a corresponding variable value regarding the gear position are provided therefrom as an output data $D_{out}$, through a judgement process. In the table of FIG. 4, in the left-hand columns, logic values "0" and "1" of the gear position signals $PS_{GH}$ and $PS_{GE}$ are listed. Each logic value "1" signals $PS_{GH}$ and $PS_{GE}$ are listed. Each logic value "1" indicates that the corresponding gear position switch, such as G135, GN - - - G5R, is closed, while the logic value "0" indicates that it is open. Symbol "X" indicates a "don't care" status, i.e., the logic value may be "1" or "0" and either will do. A judgement is made in response to each combination of the logic values "1" and "0". For example, when the signals $PS_{GH}$ and $PS_{GE}$ assume logic values "100" for the shift-side and "010" for the selection-side, it is judged that the third (3) gear position is now selected. In this way, the first (1) through fifth (5) gear positions, the reverse (R) gear, and three neutral gear (N1, N2, N3) positions can be determined in accordance with logics "0" and "1" of the signals $PS_{GH}$ and $PS_{GE}$. Further, in the judgement column, *1 denotes a shift-selection illegal state, where each of the signals $PS_{GH}$ and $PS_{GE}$ exhibits "000" logic. *2 denotes a shift-illegal state, *3 a neutral-selection illegal state, and *4 a selection illegal state. Rows including *1 through *4 represent unidentified states which may be provided during the gear changes from one gear position to another gear position. The far right column indicates values for the variable GEAR regarding the gear position. The values for the variable GEAR are indicated in the form of machine words and express the conditions set in the transmission gear box (refer to 5 of FIG. 1). Each machine word is composed by 1 byte of data, i.e., 8 bits of data, wherein each lower 4 bits expresses a respective established gear position, i.e., 01, 03, 05 - - - 06, while each upper 4 bits expresses auxiliary information. Each symbol "+" represents information obtained by ORing with the corresponding lower 4 bits of data of the gear position established immediately beforehand. Therefore, such information "+" can be utilized for executing a so-called retry operation. The retry operation is well known and is generally available in a manually operated transmission to enable a smooth reset of a gear position even though the preceding gear change did not succeed in setting that same gear position. If, for example, the gear position is set in the shift-illegal state (*2) during the retry operation, and if, for example, the gear position established immediately beforehand is expressed as "02", then the variable GEAR should be expressed as "12", i.e., 10+02. The following table displays a sequence arbitrarily selecting one gear change, i.e., from the second gear position (2) to the third gear position (3).

TABLE

| I  | 2  | →  | N1 | →  | N2 | →  | 3  |
|----|----|----|----|----|----|----|----|
| II | 02 | 12 | 0A | 2A | 0C | 1C | 03 |

The upper row represents each actual gear position, which corresponds to the value in the column "POSITION" in FIG. 4, and the lower row represents each variable value of the gears, which corresponds to the value in the column "VARIABLE" in FIG. 4. Thus, according to the present invention, the resultant judgement is obtained first in accordance with the signals $PS_{GH}$ and $PS_{GE}$ and then with reference to the table in the table memory of FIG. 4.

A corresponding N/V ratio is then read from an N/V ratio table memory (mentioned hereinafter) in response to the thus-obtained resultant judgement. This N/V ratio can be defined as $$N/V = \frac{FG \times TG \times 1000}{2\pi \times r \times 60},$$

wherein FG denotes a final gear ratio, TG a transmission gear ratio, and r a radius of the drive wheel 7 (FIG. 1). The obtained N/V ratio value, the rotation speed $\alpha$ obtained from the rotational input-shaft speed indication signal $IS_S$, and the automobile speed $\beta$ obtained from the automobile speed indication signal $IS_A$ are used to determine the gear position, in accordance with the following equation which derives a determination factor n.

$$n = |\alpha - N/V \times \beta| - \gamma$$

wherein the symbol $\gamma$ denotes a predetermined constant for compensation of error. The constant $\gamma$ itself is not absolutely essential in the present invention, and may be any value, for example, ±500 rpm.

Figure 5:
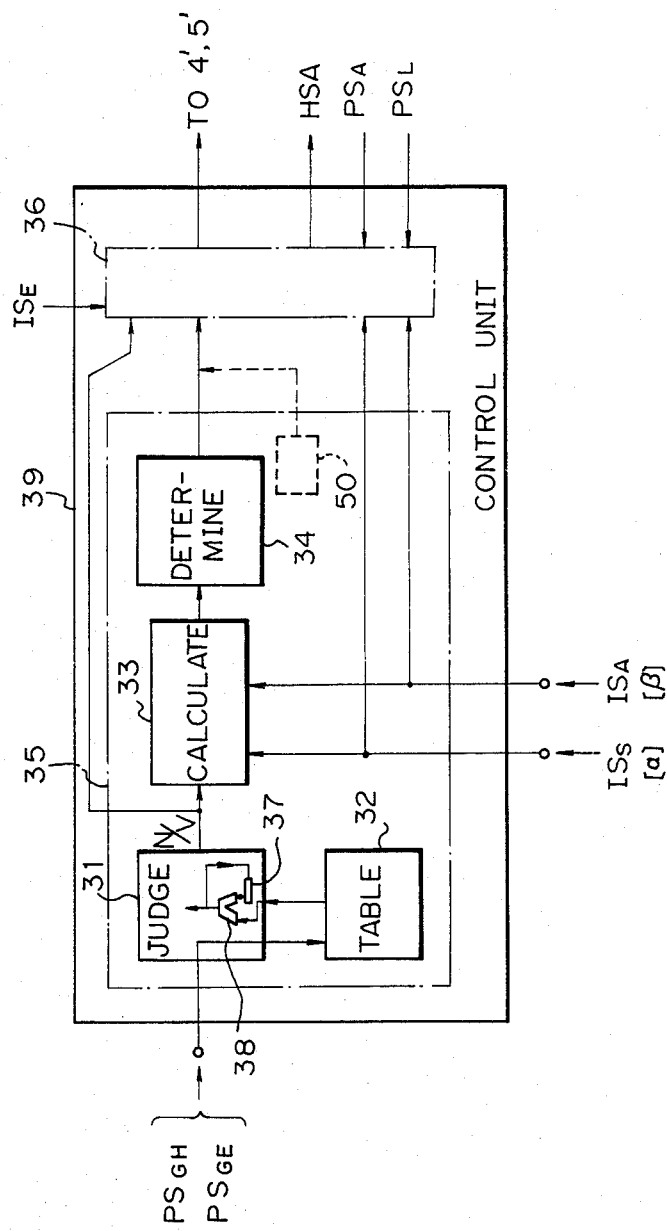
FIG. 5 is a functional block diagram of part of a control unit according to the present invention.

FIG. 5 is a functional block diagram of a part of a control unit according to the present invention. In FIG. 5, the control unit 39 receives, at least, the gear position signals $PS_{GH}$ and $PS_{GE}$ (stored in the buffer registers $BF_1$ and $BF_2$ of FIGS. 3 and 7, which are not illustrated in FIG. 5), the rotation speed indicated $\alpha$ by the rotational input-shaft speed indication signal $IS_S$, and automobile speed $\beta$ indicated by the automobile speed indication signal $IS_A$, and as a result, produces the actuation signal to be applied to the clutch actuator 4' and the transmission actuator 5', by means of the solenoid values 6. The actuation signal is produced from the usual instruction element 36 (refer to FIG. 2), as in the control unit 9 of FIG. 1. However, according to the present invention, the actuation signal is not produced until the diagnostic check element 35 allows the production of the same. The diagnostic check element 35 includes therein at least a judging element 31, a table referring element 32 (refer to the table memory of FIG. 4), a calculating element 33, and a determining element 34. The judging element 31 produces the above-mentioned N/V ratio data and sends it to the calculating element 33 by cooperating with the table referring element 32. The calculating element 33 executes the aforesaid arithmetic equation, i.e., $|\alpha - N/V \times \beta| - \gamma$, and then produces the aforesaid determination factor n. The determining element 34 determines whether or not the gear-out operation is completed, and also, whether or not the gear-in operation is completed based on the thus given determination factor n. If the determination obtains a trouble-free response, the actuation signal from the element 36 becomes effective.

The operations achieved in the diagnostic check element 35 in FIG. 5 will be clarified as follows.

(1) Where the variable (GEAR) (refer to FIG. 4) is in a range of 01 through 06, a gear-in state is assumed, (a) if the determination factor n satisfies $n \geq 0$, it is concluded, by the determining element 34, that the gear-in operation is not completed; while, (b) if $n < 0$ stands, it is concluded that the gear-in operation is completed.

(2) Where the previous variable (GEAR) was in a range of 01 through 06 (the previous variable is held in a register 37 connected to an arithmetic logic unit 38 of FIG. 5) and, at the same time, any one of the illegal states, i.e., *1 through *4 of FIG. 4, currently exist, (a) if $n \geq 0$ stands or is time, it is concluded that the gear-out operation is completed; while (b) if $n < 0$ stands or is true, it is concluded that the gear-out operation is not completed.

Figure 6:
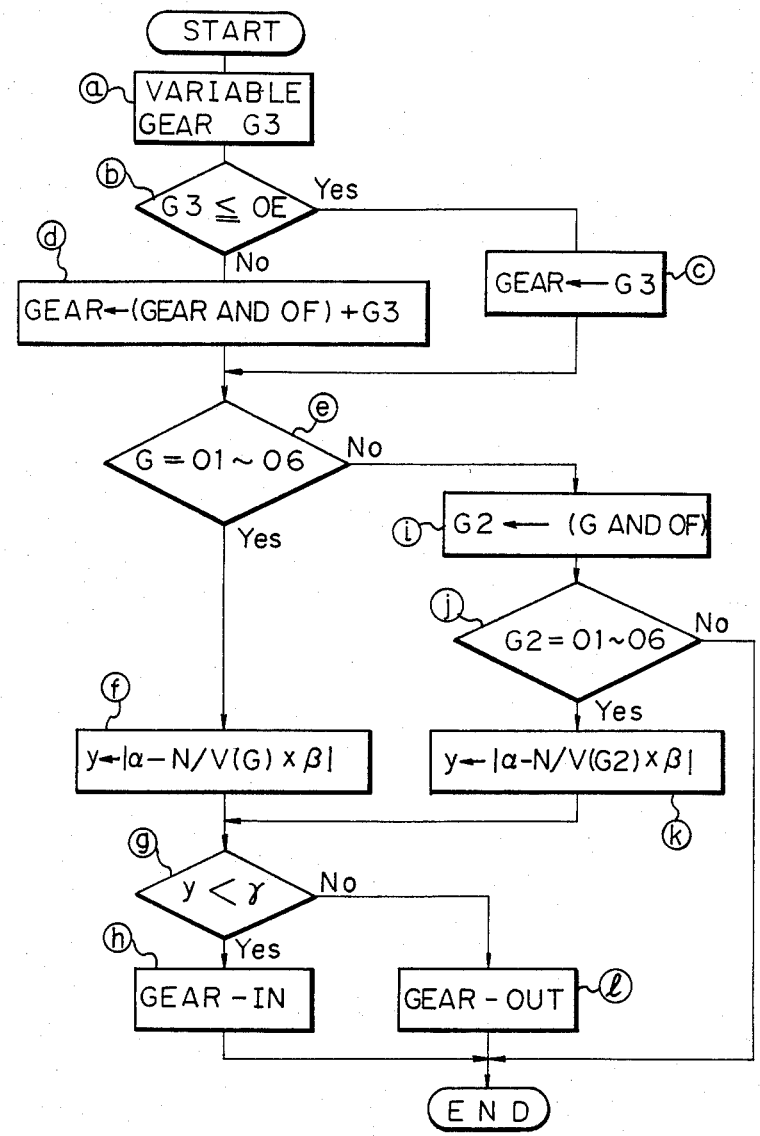
FIG. 6 is a flow chart revealing the diagnostic procedure performed in the diagnostic check element illustrated in FIG. 5.

FIG. 6 is flow chart revealing the diagnostic procedure performed in the diagnostic check element 35 illustrated in FIG. 5. Referring to FIG. 6, in step (a), the table memory (32) is accessed by the judging element 31, but initially a provisional variable GEAR G3 is arbitrarily specified, in which G3 is a value selected from the bar right column of FIG. 4. In step (b), if G3≦0E (expressed in hexadecimal notation) stands, a legal state is assumed, and therefore, in step (c), the value G3 is set for the variable GEAR as it is. If G3≦0E does not stand, an illegal state is assumed, and therefore, in step (d), the result of the logical operation GEAR and OF is added to G3 to obtain a legal variable of the gear position.

Then an inherent diagnostic check is executed at step (e). The variable GEAR G is judged, in step (e), from the viewpoint of whether or not G=01~06 stands or is true. If G=01~06 stands (corresponding to the aforesaid condition (1)), a variable y is obtained in step (f) through an equation $|\alpha - N/V(G) \times \beta|$ based on the previously recited equation for the determination factor n. In step (g), if $y < \gamma$ ($\gamma$ is the previously-mentioned constant for compensation used in the related equation) stands, the gear-in operation has been completed under the aforesaid condition (1) (b) and this is indicated in step (h) by the determining element 34 (FIG. 5). If $y \geqq \gamma$, the gear-out operation is indicated under the aforesaid condition (1)(a) in step (l).

Returning to step (e), if 01≦G≦06 does not stand (corresponding to the aforesaid condition (2)), a logical addition of the variable GEAR and the variable OF is executed, i.e., GEAR AND OF, to find a variable G2 indicating a preceding gear position. In step (j), whether or not G2 is in a range of 01 through 06 is examined. If the result is "No", the check is completed, since it is concluded that the gear position is neutral. If the result of step (j) is "Yes", a similar equation to that of step (f) is executed in step (g) with respect to the variable G2.

Figure 7:
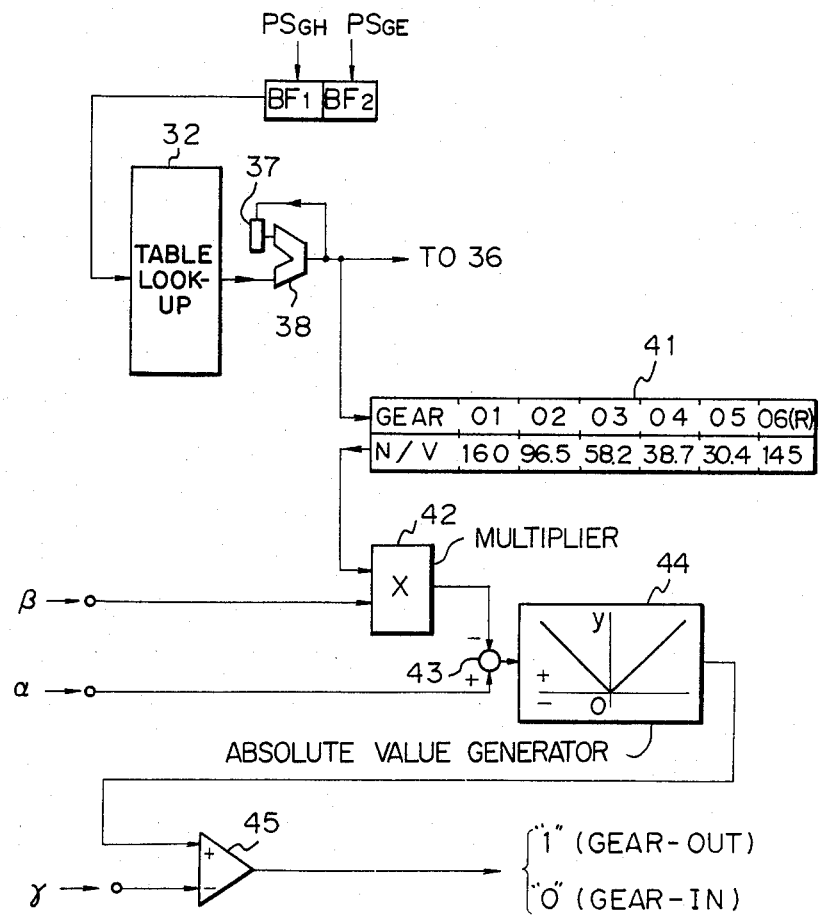
FIG. 7 is a diagram representing the diagnostic check element of FIG. 5.

FIG. 7 is a diagram representing the diagnostic check element of FIG. 5. In FIG. 7, the variable GEAR from the table 32 is, on one hand, supplied to the usual instruction element 36, and, on the other hand, to the previously mentioned N/V ratio table memory 41, which receives the variable GEAR with a value such as 01, 02 ..., and produces a corresponding value of the N/V ratio. The N/V ratio value is then given to a multiplier 42 to produce, with the automobile speed $\beta$, the values shown in FIG. 6 as $N/V(G) \times \beta$ and $N/V(G2) \times \beta$, at steps (f) and (k). In steps (f) and (k), the rotation speed $\alpha$ is subtracted by the thus multiplied value at a subtractor 43, to obtain the values $\alpha - N/V(G) \times \beta$ and $\alpha - N/V(G2) \times \beta$. The absolute values thereof can be obtained via an absolute value generating element 44 to produce each value of y to be obtained in these steps (f) and (k). The thus generated absolute value y is applied to a comparator 45 having, as a threshold level, the aforesaid constant contrast $\gamma$ for compensation of error, so that steps (g), (h), and (l) of FIG. 6 can be performed. When the output of the comparator 45 is logic "1", and if the aforementioned condition (1) stands, it is concluded that the gear-out operation is completed. While, when logic "0" is output from the comparator 45, and if the aforesaid condition (2) stands, it is concluded that the gear-in operation is completed. As a result, the determining element 34 of FIG. 5 allows the instruction element 36 to produce the actuation signal concerned.

As mentioned above, whether or not the gear change operation, i.e., gear-out and gear-in, is correctly completed can be determined according to the present invention, and, of course, the next operation, for example, engagement of the clutch 4, is not allowed to start until the gear change is confirmed to be completed: if the clutch 4 is engaged before the completion of the gear change, the transmission gears 5 would be badly damaged. From this viewpoint, the above-mentioned diagnostic check by the diagnostic check element 35 of FIG. 5 is very important. In this case, it is also important to check whether or not the switches (G135, GN, G24R, G12, G34, G5R) of the gear position sensor 21 are operating normally. If a failure occurs in at least one of those switches, the validity of the diagnostic check for the gear change operation would be lost. Therefore, it is preferable to also perform a diagnostic check for the switches of the sensor 21. It is further preferable that, if a failure occurs in one or more of the switches, a backup should be provided for the abnormal switch or switches. That is, even if such a failure occurs, the aforesaid diagnostic check on whether or not the gear change is completed should still be maintained or executed.

Figure 8:
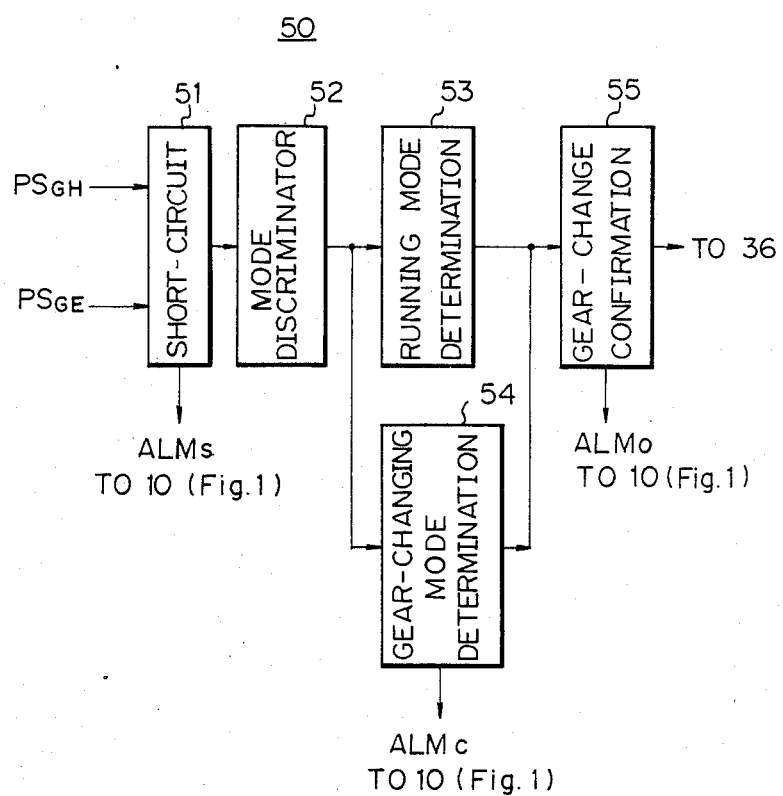
FIG. 8 is a functional block diagram of a part of a control unit according to the present invention.

FIG. 8 illustrates a functional block diagram of a part of a control unit according to the present invention. The switch check and backup element 50 of FIG. 8 is incorporated into the diagnostic check element 35 in FIG. 5. In FIG. 8, a short-circuited switch recovering element 51 functions to find a short-circuited switch and then effect a mask operation thereto, thereby invalidating the switch. A mode discriminating element 52 follows the short-circuited switch element 51, and discrimates whether or not a running mode or a gear-changing mode is established. The term running mode means that the output of the engine 3 (FIG. 1) is engaged with the drive wheel 7 (FIG. 1). A running mode determining element 53 functions to finally find the open-circuit switch, caused by a failure, with the aid of a part 55 (mentioned later) in accordance with information received regarding the condition of the clutch and the condition of the transmission gear to be selected. A gear-changing mode determining element 54 functions to also finally find such an open-circuit switch caused by a failure, with the aid of the element 55 during a gear change operation, in accordance with information received regarding the condition of the clutch, the condition of the transmission gear to be selected, and the rotation speed $\alpha$. The above-mentioned element 55 is a gear-change confirmation element which functions to confirm whether or not the desired transmission gear-in operation is completed, and allows the element 36 to produce the actuation signal. Also, if a switch failure exists, this element functions to confirm whether or not the related gear change is completed, based on a judgement of whether or not the rotation of the input-shaft is normal. The operation of the switch check and backup element 50 will be explained below.

Figure 9A:
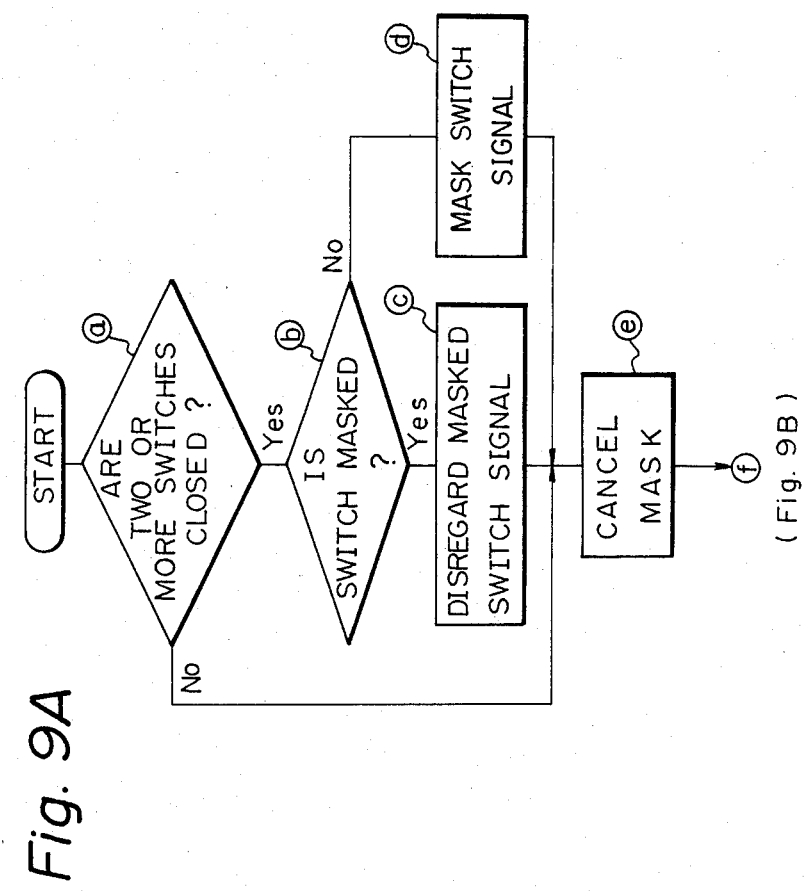
Figures 2, 9B:
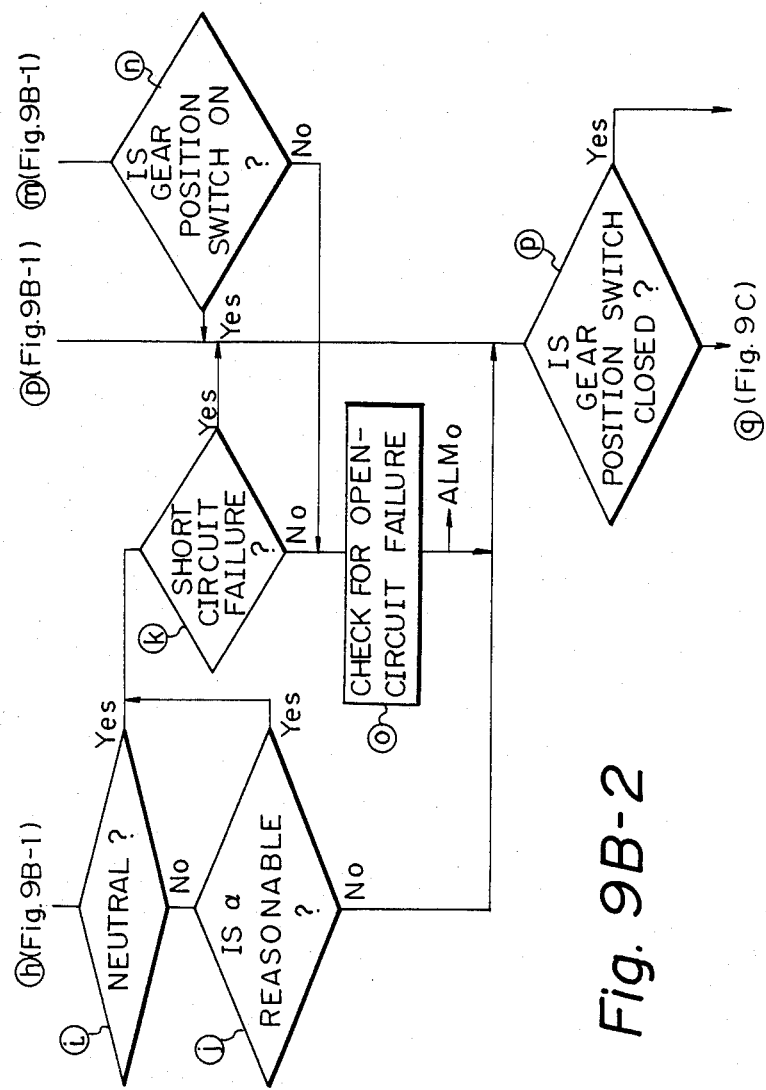
Figure 9C:
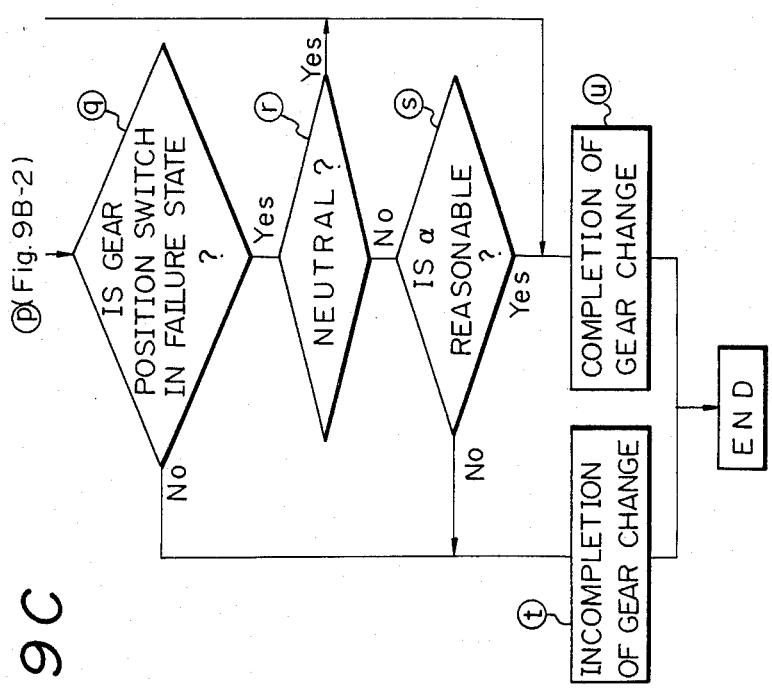

FIGS. 9A, 9B, and 9C are flow charts revealing the diagnostic procedure performed in the switch check and backup element 50 of FIG. 8. The flow charted in FIG. 9A is of the short-circuited failure of a switch dealt with by the element 51 of FIG. 8. In the normal state, two or more switches at the shift-side (FIG. 3) must not be closed simultaneously. Also, two or more switches at the selection-side must not be closed simultaneously. If, however, it is determined that a short-circuited failure has occurred, in step (a) of FIG. 9A, whether or not two or more switches have closed simultaneously is determined. If the result is "Yes", step (b) follows, but if "No", step (e) follows. Step (a) and the following steps are executed for the shift-side switches and selection-side switches separately.

In step ⓑ, i.e., when two or more switches are closed, whether or not each of the closed switches is masked or flagged is determined. If the result is "Yes" (this means that the switch was in a failure state), step ⓒ follows, but if "No" (this means that the switch was normal), step ⓓ follows. The term "mask" is defined as a particular bit (logic "1") for indicating that the on/off information of the corresponding switch is now invalid. The mask or failure flag bit is variable, and therefore, if the failed switch is restored, the mask bit is reset to logic "0". In step ⓒ, the switch having the mask bit of logic "1", i.e., a masked switch signal, is disregarded and treated as an open switch, i.e., the switch was in a failure state and is still in a failure state. This is followed by step ⓔ. On the other hand, in step ⓓ, the mask bit is set for the switch(es) newly in a failure state. In step ⓔ, the mask signal, if any, is cancelled for the open switch or open switches. During steps ⓐ through ⓓ, if the result "Yes" in step ⓑ is produced continually for a predetermined length of time, an alarm signal ALM$_S$ is output from the element 51 and sent to the indicator 10 of FIG. 1. This ALM$_S$ signal indicates that a permanent short-circuit failure has occurred in the switch, while the corresponding switch signal indicating "closed" continues to be treated as invalid.

Figure 10:
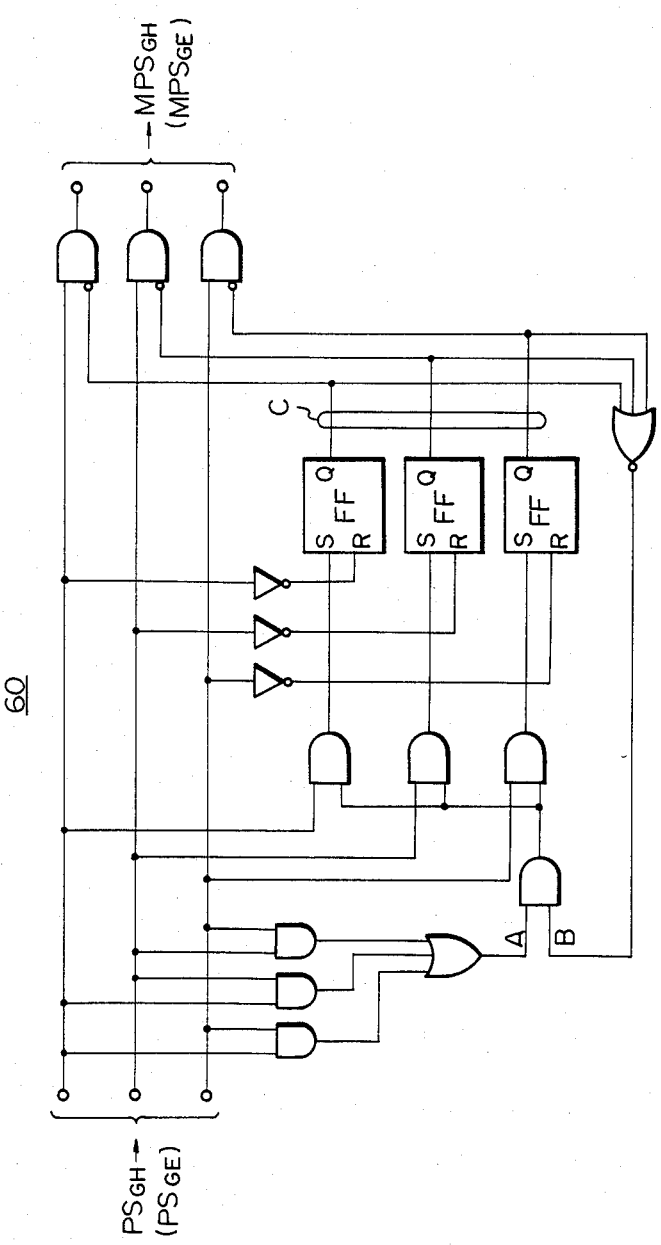
FIG. 10 is a circuit diagram of an example of a mask treating circuit.

FIG. 10 is a circuit diagram of an example of a mask treating circuit. The mask treating circuit 60 receives an inherent gear position signal PS$_{GH}$, as input data, and then produces a mask processed signal MPS$_{GH}$ as an output data. The signal MPS$_{GH}$ is then supplied to the mode discriminating element 52 of FIG. 8. Note, an identical circuit to the circuit 60 also exists for working with respect to the other signal PS$_{GE}$ and for producing the other mask processed signal MPS$_{GE}$. Further, the function of the circuit 60 can also be achieved by predetermined programs as a software process. The circuit 60 is comprised of a plurality of AND gates, inverters, and flip.flops (FF), and an OR gate and NOR gate, as illustrated. The output A from the OR gate indicates, when logic "1", that two or more switches are closed simultaneously. The output B from the NOR gate indicates, when logic "1", that no masked switch signals exist. The inputs of this NOR gate represent mask command signals C. When the signal or signals C are logic "1", the corresponding switch signal or signals are masked. Once the corresponding switch signal is changed to logic "0" (i.e., the short circuit failure is restored), the corresponding FF is reset.

The steps in FIG. 9B deal mainly with the flow of the operation of elements 52, 53, and 54 shown in FIG. 8. In step ⓕ, if the mode discriminating element 52 (FIG. 8) determines that the transmission 5 is in the running mode, step ⓘ follows, while if it determines that the transmission 5 is in the gear changing mode, step ⓖ follows. In step ⓖ, i.e., when a gear change operation is being executed, element 54 (FIG. 8) determines whether or not the clutch 4 (FIG. 1) is normal. If ("Yes"), step ⓗ follows, while if "No", step ⓟ follows. In step ⓗ the element 54 determines whether or not the gear position switch selected immediately before is changed from a closed state to an open state. If the result at step ⓗ is "OFF", step ⓘ follows, while if "ON", step ⓟ follows. In step ⓘ, the element 54 determines whether or not the desired gear position is neutral or not. If the result is "Yes", step ⓚ follows, while if "No", step ⓙ follows. In step ⓙ, the element 54 determines whether or not the rotation speed α of the input-shaft is reasonable in view of the N/V ratio value and the automobile speed β. If the result is "Yes", step ⓚ follows, while if "No", step ⓟ follows.

In step ⓚ, the element 35 determines whether or not a short-circuit failure exists at the gear position switch to be selected. If the result is "Yes", step ⓟ follows, while if "No", step ⓞ follows. If the result of step ⓚ is "No", i.e., when no short-circuit failure exists, then a diagnostic check for the switch is performed by the element 55, to determine whether or not an open switch failure exists.

The steps ⓛ, ⓜ, and ⓝ deal with the running mode determining element 53 (FIG. 8). In step ⓛ, whether or not the clutch 4 (FIG. 1) is completely engaged is determined. If the result is "Yes", step ⓜ follows, while if "No", step ⓟ follows. In step ⓜ, it is determined whether or not the desired gear position is neutral. If the result is "Yes", step ⓟ follows, while if "No", step ⓝ follows. In step ⓝ, it is determined whether or not the desired gear position switch is ON. If the result is "Yes", step ⓟ follows, while if "No", the diagnostic check for the switch regarding an open-switch failure is started. If an open-switch failure exists, an alarm signal ALM$_O$ indicating a permanent open-circuit failure is generated and sent to the indicator 10 (FIG. 1), while the element 55 (FIG. 8) further carries out its operation regardless of the existence or nonexistence of these failure signals ALM$_S$ and ALM$_O$. This shows the backup role of the element 55. An open-switch failure of a switch can be determined in step ⓞ by detecting if the switch concerned is "OPEN" when it should be closed.

Steps ⓟ through ⓤ are dealt with chiefly by the gear change confirmation element 55 of FIG. 8. In step ⓟ, it is determined whether or not the desired gear position switch is closed. If the result is "Yes", it is confirmed, in step ⓤ, that the related gear change operation is completed. This allows the element 36 (FIG. 5) to produce the relevant activation signal. If the result of step ⓟ is "No", it is determined, in step ⓠ, whether or not the desired gear position switch is in a failure state. If the result is "Yes", step ⓡ follows, while if "No", it is determined that the concerned gear change operation is not yet completed, and therefore, the element 55 inhibits the element 36 from producing the activation signal. In step ⓡ, it is determined whether or not the desired gear position is neutral. If the result is "Yes", step ⓤ follows, while if "No", step ⓢ follows. In step ⓢ, it is determined whether or not the rotation speed α of the input-shaft is reasonable, taking into account the N/V ratio value and the automobile speed β. If the result is "Yes", step ⓤ follows, while if "No", step ⓣ follows.

As mentioned above in detail, the diagnostic processing system of the present invention can determine the completion of the gear change operation by utilizing the gear position sensor, and can also check that the gear position sensor is functioning normally. Furthermore, even if a failure of the sensor occurs, the system can still oversee the completion of the gear change with a fairly high likelihood of success.

What is claimed:

1. A diagnostic processing system for an automatic transmission of an automobile having an engine speed and an automobile speed, the automatic transmission having gears and a clutch, said diagnostic processing system comprising:

gear position sensing means for generating gear position signals; and analyzation means for determining the gear position in dependence upon the engine speed, the automobile speed and the gear position signals when the gear position signals do not indicate a unique gear position.

2. A diagnostic processing system for an automatic transmission of an automobile, the automatic transmission having an input shaft and having transmission gears and a clutch which are both activated by individual actuators controlled by a control unit having an instruction element which produces the actuation signal for the actuators, the actuation signal being produced with reference to a predetermined transmission map in response to input data including a rotation speed of the input-shaft, an automobile speed, an accelerator pedal position, a clutch position, and an engine speed, said system comprising:

a gear position sensor, coupled to the transmission gears, for generating gear position signals; and a diagnostic check element, operatively connected to said gear position sensor, the instruction element in the control unit and to receive the input data, for judging a gear position of the transmission gears based on the gear position signals output from said gear position sensor and producing an output indicating whether a gear change is completed by analyzing the gear position, the rotation speed and the automobile speed.

3. A system as set forth in claim 1, wherein said gear position sensor comprises:

shift-side switches, coupled to the transmission gears, for producing shift-side gear position signals; and selection-side switches, coupled to the transmission gears and arranged in an orthogonal manner to said shift-side switches, for producing selection-side gear position signals, the gear position signals comprising both the shift-side and selection-side gear position signals.

4. A system as set forth in claim 3, wherein said diagnostic check element comprises a table memory, for storing a table which translates to gear position signals into a variable value corresponding to the gear position indicated by the gear position signals.

5. A system as set forth in claim 4, wherein said diagnostic check element further comprises:

a table referring element operatively connected to said table memory;

an N/V ratio table memory;

a judging element, operatively connected to said gear position sensor, said table referring element and said N/V ratio table memory, for producing the gear position using the variable value from said table memory and producing an N/V ratio value in dependence upon the variable value, using said N/V ratio table memory;

a calculating element, operatively connected to said judging element and to receive the rotation speed and automobile speed, for producing a determination factor through a predetermined procedure using the N/V ratio value from said N/V ratio table memory, the rotation speed and the automobile speed; and a determining element, operatively connected to the instruction element and said calculating element, for producing a determination result by analyzing the determination factor and the input data, the determination result being output from said diagnostic check element; to the instruction element.

6. A system as set forth in claim 5, wherein said calculating element comprises:

multiplying means operatively connected to said judging element and to receive the automobile speed, for multiplying the N/V ratio value by the automobile speed to generate a first result;

subtracting means, operatively connected to said multiplying means and to receive the rotation speed, for subtracting the first result from the rotation speed to generate a second result;

an absolute value generating means, operatively connected to said subtracting means, for generating the absolute value of the second result; and error compensation means, operatively connected to said absolute value generating means and said determining element, for producing the determination factor by subtracting a predetermined constant for compensation of error from the absolute value of the second result.

7. A system as set forth in claim 6, wherein the determination result produced by said determining element indicates that a gear-in state of the gear change is completed when the determination factor is less than zero and the variable value has a legal state, indicating that one of said shift-side switches and one of said selection-side switches are closed simultaneously, wherein said judging element stores a preceding variable value, and wherein the determination result indicates that a gear-out state of the gear change is completed when the determination factor is non-negative, the variable value has an illegal state and the preceding variable value has the legal state, the illegal state indicating one of shift-illegal, selection-illegal, neutral-selection-illegal and shift-selection-illegal states.

8. A system as set forth in claim 3, wherein said diagnostic check element comprises a switch check and backup element, operatively connected to the instruction element and each of said shift-side and selection-side switches, for ensuring that the output of said diagnostic check element is valid and backing up said shift-side and selection-side switches if a failure occurs in said shift-side and selection-side switches.

9. A system as set forth in claim 8, wherein said switch check and backup element comprises:

short-circuited switch recovering element, operatively connected to said switch-side and selection-side switches to receive the gear position signals, for identifying a short-circuited switch which generates a failed gear position signal, performing a mask operation on the failed gear position signal to invalidate the failed gear position signal with a mask bit and resetting the mask bit when the short-circuited switch is restored;

a mode discriminating part, operatively connected to said short-circuited switch recovering element, for determining which of a running mode and a gear-changing mode is established;

a gear-changing mode determining element, operatively connected to said mode discriminating part, for determining whether the clutch is normal, whether a preceding gear position switch is closed, and whether the rotation speed is reasonable;

a running mode determining element operatively connected to said mode discriminating element for determining whether the clutch is completely engaged, whether a desired gear position is a neutral position, and whether a desired gear position switch, corresponding to the desired gear position, is closed; and a gear change confirmation element operatively connected to said running mode determining element and said gear-changing mode determining element, for indicating an open-circuit switch in said gear position sensor during a gear change, wherein said gear change confirmation element indicates the open-circuit switch, when the desired gear position switch is not the short-circuited switch and said gear-changing mode determining element determines that the clutch is normal, the preceding gear position switch is open and either the desired gear position is the neutral position or the rotation speed is reasonable, wherein said gear change confirmation element indicates the open-circuit switch, when the desired gear position switch is open and said running mode determining element determines that the clutch is completely engaged and the desired gear position is not neutral, and wherein said gear change confirmation element supports the short-circuited and open-circuit switches by determining completion of the gear change when the desired gear position switch is one of the short-circuited and open-circuit switches, if either the desired gear position is neutral or the rotation speed is reasonable, as well as when the desired gear position switch is closed.

10. A system as set forth in claim 9, wherein said gear-changing mode determining element determines whether the rotation speed is reasonable in dependence upon the N/V ratio value and the automobile speed.

11. A system as set forth in claim 10, wherein said short-circuited switch recovering element sets the mask bit when at least two switches of said shift-side switches are closed simultaneously and when at least two switches of said selection-side switches are closed simultaneously.

12. A diagnostic processing method for an automatic transmission of an automobile having an engine speed and an automobile speed, the automatic transmission having transmission gears and a clutch and the transmission gears having a gear position sensed by a gear position sensor, said diagnostic processing method comprising the steps of:

(a) determining gear position in dependence upon gear position signals from the gear position sensor;

(b) analyzing the gear position, the engine speed and the automobile speed to determine whether the engine speed and the gear position could produce the automobile speed; and (c) indicating whether a gear change has been completed in dependence upon said analyzing in step (b).

13. A diagnostic processing method as set forth in claim 12, wherein step (a) comprises the step of converting the gear position signals into a gear value, and wherein step (b) comprises the steps of:

(bi) producing a speed ratio relating engine speed to automobile speed, in dependence upon the gear value; and (bii) producing a determination factor using the speed ratio, the engine speed and the automobile speed.

14. A diagnostic processing method as set forth in claim 13, wherein step (bii) comprises the steps of:

(bii1) multiplying the speed ratio by the automobile speed to produce a first result;

(bii2) subtracting the first result from the engine speed to form a second result; and (bii3) generating the determination factor by subtracting a predetermined error compensation factor from the absolute value of the second result.

15. A diagnostic processing method as set forth in claim 12, wherein the gear position sensor comprises switches including a desired gear position switch at a desired gear position, and wherein step (c) comprises the steps of:

(ci) determining whether the desired gear position switch is short-circuited;

(cii) determining whether the desired gear position switch is open-circuited; and (ciii) indicating whether the gear change has been completed even if the desired gear position switch is short-circuited and even if the desired gear position switch is open-circuited.

16. A diagnostic processing method as set forth in claim 15, wherein step (ci) comprises the steps of:

(ci1) determining whether more than one of the switches in the gear position sensor are closed switches;

(ci2) checking whether one of the closed switches has previously been identified as being short-circuited; and (ci3) masking the gear position signals from the gear position sensor if more than one of the switches are closed and have not been previously identified as being short-circuited.

17. A diagnostic processing method as set forth in claim 15, wherein the automatic transmission operates in a running mode when the transmission gears are engaged and in a gear-changing mode when the transmission gears are not engaged, and wherein step (cii) comprises the steps of:

(cii1) determining whether the automatic transmission is in the running mode or the gear-changing mode;

(cii2) determining whether the clutch is normal if the automatic transmission is in the gear-changing mode;

(cii3) determining whether a preceding gear position switch is off if the clutch is normal in the gear-changing mode;

(cii4) determining whether the desired gear position is neutral if the preceding gear position switch is open when the clutch is normal in the gear-changing mode;

(cii5) determining whether the engine speed indicates engagement if the desired gear position is non-neutral when the preceding gear position switch is open and the clutch is normal in the gear-changing mode;

(cii6) indicating that the desired gear position switch is open-circuited if the desired gear position switch has not been previously identified as short-circuited and either the desired gear position is neutral or the engine speed indicates engagement, when the preceding gear position switch is off and the clutch is normal in the gear-changing mode;

(cii7) determining whether the clutch is engaged if the automobile is in the running mode;

(cii8) determining whether the desired gear position is neutral when the clutch is engaged in the running mode; and (cii9) indicating the desired gear position switch is open-circuited when the desired gear position switch is open, the desired gear position is non-neutral and the clutch is engaged in the running mode.

18. A diagnostic method as set forth in claim 15, wherein step (ciii) comprises the steps of:

(ciii1) determining whether the desired gear position switch is closed;

(ciii2) determining whether the desired gear position switch is in a failure state or a non-failure state if the desired gear position switch is open;

(ciii3) determining whether the desired gear position is neutral if the desired gear position switch is in the failure state and is open;

(ciii4) determining whether the engine speed indicates engagement if the desired gear position is non-neutral and the desired gear position switch is in the failure state and open;

(ciii5) indicating incompletion of the gear change if either the desired gear position switch is in the non-failure state and open, or the engine speed does not indicate engagement when the desired gear position is non-neutral and the desired gear position switch is in the failure state and open; and (ciii6) indicating completion of the gear change when the desired gear position switch is closed, when the desired gear position is neutral and the desired gear position switch is in the failure state and open, and when the engine speed indicates engagement, the desired gear position is neutral and the desired gear position switch is in the failure state and open.

* * * * *

UNITED STATES PATENT AND TRADEMARK OFFICE
CERTIFICATE OF CORRECTION

PATENT NO. : 4,642,771

DATED : February 10, 1987

INVENTOR(S) : Asagi et al.

It is certified that error appears in the above-identified patent and that said Letters Patent is hereby corrected as shown below:

Front page [73], after "Kawasaki, Japan" insert

--and Isuzu Motors Limited, Tokyo, Japan--.

Signed and Sealed this

Eighth Day of September, 1987

Attest:

DONALD J. QUIGG

Attesting Officer

Commissioner of Patents and Trademarks